Feb. 16, 1937.    L. M. GOLDSMITH    2,070,590
ELECTRICAL CONTROL
Filed May 31, 1934
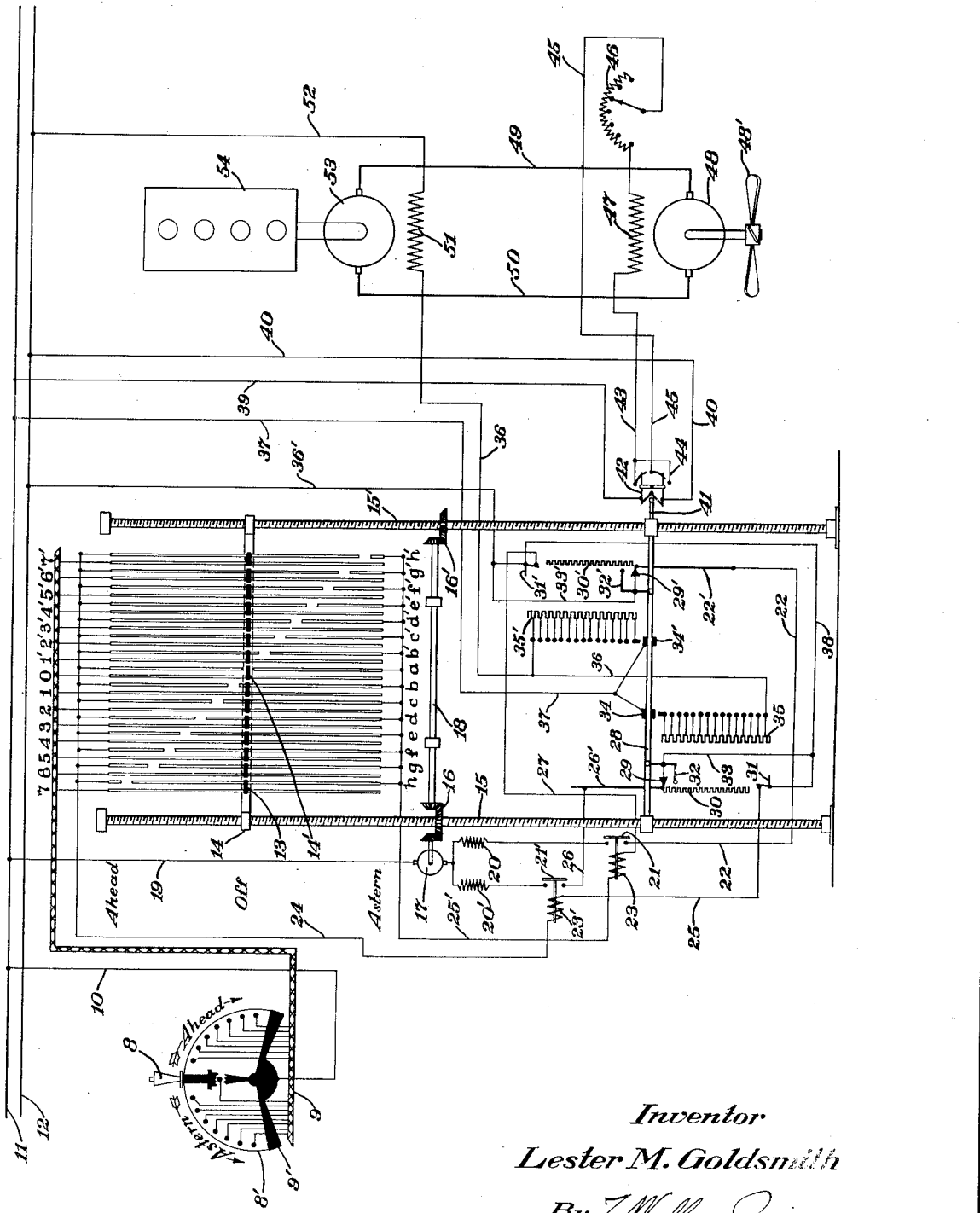
Inventor
Lester M. Goldsmith
By T. Wallace Quinn
his Attorney Patented Feb. 16, 1937

2,070,590

UNITED STATES PATENT OFFICE 2,070,590

ELECTRICAL CONTROL

Lester M. Goldsmith, Philadelphia, Pa., assignor to The Atlantic Refining Company, Philadelphia, Pa., a corporation of Pennsylvania Application May 31, 1934, Serial No. 728,359

25 Claims. (Cl. 172—8)

The present invention relates to apparatus for controlling the rate at which power may be supplied to electrical equipment, particularly electric motors, and has special application in the electrical propulsion of ships and transportation means such as electrically driven locomotives, cars and similar conveyances. It is equally applicable to any electrically driven device in which the speed-time relationship or rate of acceleration is of prime importance. My invention is adapted to regulate the supplying of power to electrically motivated mechanisms to which can be assigned predetermined optimum conditions for the application of electromotive force. For example, in order to obtain maximum efficiency in the electrical propulsion of ships or trains, the acceleration of the same must be controlled in such a manner as to avoid overloading the motor and to prevent slippage of the propeller or driving wheels. Equations governing the proper rate of application of power may be developed and these equations may be put into practice in accordance with my invention, either in the case of a generator supplying current or in the case of the driving motor itself.

In the electric or mechanical propulsion of ships it is common to have a control lever which is freely rotatable and which when moved in one direction from its neutral position will effect application of power to cause the ship to move ahead, and when moved in the opposite direction therefrom will effect application of power to cause the ship to move astern. A reversal in direction of motion of the ship means a reversal in the direction of motion of the driving motor. The rate of acceleration of the ship, either ahead or astern, depends on the rate of application of power (or voltage) to the driving motor.

It is an object of my invention to control the rate at which power can be applied to the electric driving motor, and hence the propeller, to prevent the electric motor, and/or the generator which feeds it, from being loaded excessively, and to prevent the propeller from being rotated at such a high rate that it will have an excessive slip-ratio or churning action. By my invention I provide this control regardless of how quickly the control lever in the pilot house is thrown to the position of "full ahead" or to the position of "full astern".

It is a further object of my invention to limit the rate at which power is applied to the driving motor only to the extent necessary to prevent overloading of the electric motor and/or generator and to obviate excessive slip or churning of the propeller. That is, it is desired to obtain as great a thrust force as possible from the propeller (without overloading the motor) during acceleration and at every speed of the ship.

Also, it is an object of my invention to provide that the withdrawal of power may be made much more rapidly than the application of power. These and other objects will appear from the following description.

I have found from experience that, if the propeller of a ship is made to exert approximately its maximum thrust during the period of acceleration of the ship from zero speed to full speed, speed S of the ship will be related to time "$t$" (elapse of time from starting) generally according to the law expressed by equation $S=Kt^x$, where "$x$" is some number less than unity and K is a constant. To provide this type of acceleration of the ship, the power developed by the electric driving motor must be approximately proportional to the cube of the elapsed time "$t$", i. e., $P=K_2 t^3$, where P is the power developed and "$K_2$" is a second constant which may or may not be the same as the constant "K" above referred to. In general, this manner of increasing the power output of an electric driving motor is approximately in accord with its starting characteristics and will not result in excessive overload of the same at any time during starting, because the higher the speed of the motor the greater will be its counter electromotive force and the more rapidly power applied thereto may be increased without injuring the motor windings. To provide this type of power increase of the motor and acceleration of the ship, I have found that I may control these factors by regulating withdrawal or short-circuiting of resistance from the field circuit of the generator which supplies the driving motor, the withdrawal of resistance with elapse of time being made approximately according to the general law expressed by equation $$R=\frac{C}{t^x}$$

where R is resistance of generator field, C is some constant, "$t$" is time elapsed after starting, and "$x$" is some constant power of "$t$", usually unity or approximately unity. That is, I withdraw or short-circuit resistance from the generator field circuit most rapidly at the start and most slowly as full speed of the ship is approached.

The accompanying drawing illustrates apparatus suitable for accomplishing this type of control.

Referring to the drawing, prime mover 54, as for example a Diesel engine or steam turbine, drives generator 53 which supplies current to an electric motor 48, said motor driving the propeller 48'. The pilot house control lever 8 is freely rotatable to the position of full ahead or full astern, as desired, but the other portions of my control mechanism, as hereafter described, control the rate at which the power developed by the propeller motor 48 will increase in proportion to the cube of the elapsed time.

If it is desired to propel the vessel in forward motion, the control switch lever 8 is advanced in the "ahead" position. Assuming that said lever is placed in position for full "ahead", contact is made with the uppermost point on the left hand side of the control switch 8'. Current, supplied to exciter bus 11 and 12 by means of an auxiliary generator or exciter (not shown), flows from bus 11 through line 10, switch blade 9' and cable 9 to contact bar 7. Sliding contact 13 conducts this current to contact bar "h" from whence it flows through line 25' to energize relay coil 23 which closes switch 21. The relay circuit is completed through line 27, limit switch 31' and line 36' to bus 12. This circuit being closed, relay switch 21 is closed, and current flows from bus 11 through line 19 to operate motor 17, which is a series wound motor with field windings 20 and 20' providing for reversal of direction. The current flows through motor field coil 20, which controls the direction in which the motor armature rotates. In this instance the direction of rotation of said armature is such that the bevel gear 16, shaft 18 and gear 16' cause the worm threaded shafts 15 and 15' to drive the horizontal bars 14 and 28 in an upward direction. The motor circuit from field 20 is completed through relay switch 21, line 22, contact 29', lines 33' and 36' to bus 12. In its motion upward the horizontal bar 28 carrying contactors 34' and 29' and limit switch breaker 32', simultaneously effects a slowing down of motor 17, and decreases the resistance in the field circuits of generator 53.

In its upward motion, contactor 29' gradually increases the resistance in field 20 of motor 17 by cutting in more and more of resistance 30', thereby decreasing the speed of motor 17. Simultaneously, contactor 34' of line 37, in its upward progress, gradually decreases the amount of resistance in generator field 51 by cutting out more and more of resistance 35'. Field current is supplied to generator 53 from exciter bus 11 through line 37, contactor 34', resistance 35', line 36, field winding 51 and line 52 to bus 12. Thus, it will be seen that resistance is withdrawn from the generator field circuit most rapidly at the start and more slowly as full speed of the ship is approached.

In its upward motion, extension 41 of the horizontal bar 28, trips the reversing switch 42 in the field circuit of propeller motor 48. In this case, when the ship is in forward motion, current flows from exciter bus 11 through line 39, reversing switch arm 42, line 45, field rheostat 46, motor field 47, lines 43, 44 and 40 to bus 12.

When the sliding contact 13 of the horizontal bar 14 reaches the upper end of contact bar 7 and the gap of bar "h," the relay circuit of switch 21 is broken, switch 21 opens and the motor 17 stops. In the event that relay switch 21 should fail to open and the motor 17 continues to function, limit switch 31' of the motor circuit would be opened by limit switch breaker arm 32', thus breaking the motor circuit and effecting stoppage of motor 17. At this point, all of resistance 35' has been cut out of the field circuit of generator 53, excitation of generator field 51 has reached a maximum and maximum voltage is delivered to propeller motor 48 by lines 49 and 50. The voltage of separately excited motor field 47 may be regulated by means of rheostat 46.

In order to bring the propeller motor from full "ahead" to neutral, i. e., all power shut off from motor 48, the lever 8 of control switch 8' is brought to its central position. Current then flows from bus 11 through line 10, center contact of switch 8' and cable 9 to contact bar 0. Central sliding contact 14' of horizontal bar 14 conducts current from contact bar 0 to contact bar "a" (upper end), from whence it flows through line 24 to energize relay coil 23' to thus close switch 21'. The relay circuit is completed through line 25, limit switch 31, and lines 38 and 36' to bus 12.

With the closing of relay switch 21', the motor circuit is completed and current passes from bus 11 through line 19 and reverse motor field coil 20', relay switch 21' and line 26 to contact bar 26'. Sliding contactor 29 of horizontal bar 28 completes the motor circuit through lines 33, 38 and 36' to bus 12. By thus reversing the direction of motion of the armature, motor 17 now operates worm threaded shafts 15 and 15' to cause a lowering of horizontal bars 14 and 28. It will be seen that motor 17, by means of the geared shafts, lowers the bars 14 and 28 very rapidly to their neutral position, i. e., "off" position, by reason of the fact that there is no resistance inserted in the circuit of motor 17 until after bar 28 has reached its neutral or "off" position.

The lowering of bar 28 from its upper or "ahead" position, simultaneously increases the amount of resistance 35' thrown into the generator 53 field circuit, by means of contactor 34' attached to said horizontal bar 28. This increase in resistance in the field circuit decreases the field excitation of generator 53 and thus lowers the voltage supplied to propeller motor 48, allowing said motor to slow down.

Upon the arival of horizontal bar 14 at its "off" position, sliding contact 14' reaches the gap in the contact bar "a" and the relay 23' circuit is opened, thereby allowing switch 21' to open and thus break the circuit of motor 17. Stoppage of motor 17 leaves the horizontal bars 14 and 28 in their neutral positions, and contactor 34' of the bar 28 has passed the lowermost point of resistance 35', thus breaking the field circuit 51 of generator 53 and shutting off current supplied to motor 48.

If it is desired to propel the vessel "astern", the control switch lever 8 is advanced in the "astern" position. The mechanism, as above described, now functions as before but in the reverse sense. Assuming lever 8 to be placed at full "astern", the contact bars 7' and h' are energized, thus closing the circuit of relay coil 23' and relay switch 21, which switch in turn, closes the circuit of motor field coil 20' and causes motor 17 to operate shafts 15 and 15' to lower the horizontal bars 14 and 28 to the "astern" position. The functioning of the entire centrol system is such as to apply power to the propeller motor 48 in proportion to the cube of the elapsed time, in a manner analogous to that above described for propelling the vessel in forward motion.

It will be seen that by the arrangement of my bank of contact bars, 0, 1, 2, 3 * * * 1', 2', 3', etc., and a, b, c, * * * b', c', etc., it is possible to set the control lever 8 in any desired position "ahead" or "astern" intermediate the positions full "ahead" or full "astern" and have the control apparatus automatically regulate the application of power to the propeller motor 48, approximately in accordance with the law and equation given hereinbefore. By means of my apparatus, it is possible to set the control lever 8 at any desired contact point and have the power applied at a predetermined rate to the motor 48. At such time when the sliding contact of horizontal bar 14 reaches a gap in the vertical contact bar which corresponds to a given contact point of control switch 8', the motor 17 will stop and the amount of resistance 35 or 35' in the field 51 of generator 53 will be maintained constant until the control lever 8 is moved either further "ahead" or "astern", or into the "off" position.

It will be clear from the above description that, no matter how quickly the lever 8 of the control switch 8' is moved to either extreme position of full power, the rate at which power is applied to the propeller motor is controlled by the speed of the motor 17. Hence, while the lever 8 may be quickly moved to one position of extreme power, yet the time required to supply full power to the propeller motor will still be the definite predetermined period. This period may be from 15 to 30 seconds, for example, in the operation of certain ships. However, just what time interval is desired in changing from zero power on the propeller motor to full power thereon will depend on the ship itself, the size and design of the propeller, and the electric propeller equipment. The rate at which power applied to the propeller motor can be increased will be limited so as to avoid excessive slip of the propeller and excessive overloading of the electrical propulsion equipment, including electric motor and generator and the prime mover which drives the latter.

The speed of the motor 17 is controlled during acceleration of the propeller by variation of the resistances in its field circuit in such manner that the resistance in the field circuit of the generator 58 varies approximately according to the general law expressed by the equation $$R = \frac{C}{t^x}$$

where R is the resistance of the generator field circuit, C is a constant, $t$ is elapsed time after starting and $x$ is a constant usually unity or approximately unity. Such field circuit resistance variation is effected until the desired propeller speed is obtained. Correspondingly, the power developed by the propeller increases approximately in accordance with the general law $P=K_2 t^3$ where P is the power developed, $K_2$ is a constant and $t$ is elapsed time from starting. The generator field circuit resistance varies approximately as a curved line function of the reciprocal of elapsed time from starting while the power developed by the propeller increases approximately as a curved line function of the elapsed time. By such control of acceleration, power is applied to the driving motor only at the proper rate and to the extent necessary to bring the propeller up to speed in the minimum time without overloading the motor.

It is to be understood that various modifications may be made in the device above described, without in any way departing from the spirit of the invention defined in the appended claims and that approximately similar advantages may be obtained by varying the generator field circuit resistance in increments resulting in a broken line power increase curve generally similar in outline to the smooth power increase curve above referred to.

What I claim is:

1. In the method of accelerating an electric propulsion system comprising two dynamo electric machines, one a generator and the other a motor supplied with power from said generator and a propelling means associated with said motor, the step which comprises controlling the field strength of one of said dynamo electric machines to increase the power developed in the propelling means approximately as a curved line function of the elapsed time from starting.

2. In the method of operating an electric propulsion system wherein an electric driving motor is supplied with power from a generator the step which comprises varying the resistance in the field circuit of the said generator, during acceleration, most rapidly at first and more slowly as full power of said electric driving motor is approached.

3. In the method of accelerating an electric propulsion system comprising two dynamo electric machines, one a generator and the other a motor supplied with power from said generator and a propeller driven by said motor, the step which comprises controlling the field strength of one of said dynamo electric machines to increase the power developed in the propeller approximately as a curved line function of elapsed time from starting.

4. In the method of accelerating an electric propulsion system comprising two dynamo electric machines, one a generator and the other a motor supplied with power from said generator and a propeller driven by said motor, the step which comprises controlling the field strength of one of said dynamo electric machines to increase the power developed in the propeller approximately as a function of the cube of the elapsed time from starting.

5. In the method of accelerating an electric propulsion system comprising two dynamo electric machines, one a generator and the other a motor supplied with power from said generator and a propeller driven by said motor, the step which comprises controlling the field strength of one of said dynamo electric machines to increase the power developed in the propeller approximately in accordance with the relation $P=K_2 t^3$ where P is the power, $K_2$ is a constant and $t$ is the elapsed time from starting.

6. In the method of accelerating an electric propulsion system comprising a generator, a motor supplied with power from said generator and a propeller driven by said motor, the steps which comprises controlling the generator field strength to increase the power developed in the propeller approximately as a curve line function of elapsed time from starting.

7. In the method of accelerating an electric propulsion system comprising a generator, a motor supplied with power from said generator and a propeller driven by said motor, the step which comprises controlling the generator field strength to increase the power developed in the propeller approximately as a function of the cube of the elapsed time from starting.

8. The method of accelerating an electric propulsion system comprising a generator, a motor supplied with power from said generator and a propeller driven by said motor, said method comprising varying the generator field circuit resistance as a curved line function of the reciprocal of elapsed time from starting.

9. The method of accelerating an electric propulsion system comprising a generator, a motor supplied with power from said generator and a propeller driven by said motor, said method comprising varying the generator field circuit resistance as a curved line function of the reciprocal of a constant power of elapsed time from starting.

10. The method of accelerating an electric propulsion system comprising a generator, a motor supplied with power from said generator and a propeller driven by said motor, said method comprising varying the generator field circuit resistance in accordance with the relation $$R = \frac{C}{t^x}$$

where R is the resistance, $t$ is the elapsed time from starting and C and $x$ are constants.

11. The method of operating an electric ship propulsion system wherein a propeller is driven by an electric motor supplied with power from a generator which includes withdrawing resistance from the field circuit of said generator, during acceleration, most rapidly at first and more slowly as full power of said electric motor is approached and reintroducing said resistance into said generator field during deceleration.

12. The method of operating an electric ship propulsion system wherein a propeller is driven by an electric motor supplied with power from a generator which includes withdrawing resistance from the field circuit of said generator, during acceleration, most rapidly at first and more slowly as full power of said electric motor is approached and reintroducing resistance into said generator field during deceleration at a substantially greater rate than the average rate of withdrawal during acceleration.

13. The method of operating a ship propulsion system wherein a propeller is driven by an electric motor supplied with power from a generator which includes withdrawing resistance from the field circuit of said generator during acceleration, and simultaneously reducing the rate of withdrawal of resistance as the resistance of said field circuit is reduced, thereby to control the rate at which power developed by said motor increases.

14. A propulsion system comprising two dynamo electric machines, one a generator and the other a motor supplied with power from said generator, a propeller driven by said motor, means including a second motor for controlling the field strength of one of said dynamo electric machines to increase the power developed in the propeller approximately as a curved line function of elapsed time from starting, means for controlling the speed of said second motor.

15. A propulsion system comprising two dynamo electric machines, one a generator and the other a motor supplied with power from said generator, a propeller driven by said motor, means including a second motor for controlling the field strength of one of said dynamo electric machines to increase the power developed in the propeller as a function of the cube of the elapsed time from starting, means for controlling the speed of said second motor.

16. A propulsion system comprising two dynamo electric machines, one a generator and the other a motor supplied with power from said generator, a propeller driven by said motor, means including a second motor for controlling the field strength of one of said dynamo electric machines to increase the power developed in the propeller in accordance with the relation $P = K_2 t^3$ where P is the power, $K_2$ is a constant and $t$ is the elapsed time from starting, means for controlling the speed of said second motor.

17. A propeller system comprising a generator, a motor supplied with power from said generator, a propeller driven by said motor, means including a second motor for controlling the generator field strength to increase the power developed in the propeller as a curved line function of elapsed time from starting, means for controlling the speed of said second motor.

18. A propeller system comprising a generator, a motor supplied with power from said generator, a propeller driven by said motor, means including a second motor for controlling the generator field strength to increase the power developed in the propeller as a function of the cube of elapsed time from starting, means for controlling the speed of said second motor.

19. A propulsion system comprising a generator, a motor supplied with power from said generator, a propeller driven by said motor, means including a second motor for varying the generator field circuit resistance approximately as a curved line function of the reciprocal of elapsed time from starting, means for controlling the speed of said second motor.

20. A propulsion system comprising a generator, a motor supplied with power from said generator, a propeller driven by said motor, means including a second motor for varying the generator field circuit resistance approximately in accordance with the relation $$R = \frac{C}{t^x}$$

where R is the resistance, $t$ is the elapsed time from starting and C and $x$ are constants, means for controlling the speed of said second motor.

21. An electric propulsion system comprising a prime mover, a dynamo electric machine driven thereby, a propeller, a dynamo electric machine adapted to drive said propeller, said propeller driving machine being supplied with electric power from said first mentioned machine, means including a small electric motor for controlling the excitation of one of said machines during acceleration of the propeller, and means for regulating said excitation controlling means so as to vary the field of said one machine, said last mentioned means including a resistance adapted to be varied in a circuit feeding said small motor when said small motor operates to vary the excitation of said one dynamo electric machine, thereby to change the rate at which said excitation is varied depending upon the magnitude of the excitation.

22. An electric propulsion system comprising a prime mover, a generator driven by said prime mover, a propeller, an electric motor adapted to drive said propeller, said motor being fed by said generator, means for reversing the current through the motor field, a variable resistance in said generator field, and means for cutting resistance from said generator field during acceleration of the propeller most rapidly at the start and more and more slowly as full speed of the propeller is approached.

23. An electric propulsion system comprising a prime mover, a generator driven by said prime mover, a propeller, an electric motor adapted to drive said propeller, said generator supplying power to said motor, means including a small electric motor for cutting resistance out of the generator field circuit during acceleration of propeller, thereby to increase the generated voltage, and means for reducing the speed of said small motor correspondingly as more and more resistance is cut out of said generator field, thereby to reduce the rate at which resistance is cut out of the generator field circuit as the amount of said resistance in circuit becomes less, said last mentioned means being controlled by the rotation of said small motor.

24. A propulsion system comprising two dynamo electric machines, one a generator and the other a motor supplied with power from said generator, a propeller driven by said motor, means including a small electric motor for controlling the field strength of one of said dynamo electric machines during acceleration, and means for regulating said field strength controlling means so as to control the field strength of said one dynamo electric machine to increase the power developed in the propeller as a curved line function of elapsed time from starting.

25. A propulsion system comprising two dynamo electric machines, one a generator and the other a motor supplied with power from said generator, a propeller driven by said motor, means including a small electric motor for controlling the field strength of one of said dynamo electric machines during acceleration, and means for regulating said field strength controlling means so as to control the field strength of said one dynamo electric machine to increase the power developed in the propeller as a curved line function of elapsed time from starting, said last-named means including a field circuit resistance for said small motor adapted to be varied when said small motor operates to vary the field strength of said one dynamo electric machine, thereby to control the speed of said motor in accordance with the magnitude of the field strength of said one dynamo electric machine.

LESTER M. GOLDSMITH.